Nov. 11, 1969     R. P. VAN DRIESEN     3,477,944
MAINTENANCE OF FLUID FLOW IN HEAVY
HYDROCARBON OIL HYDROGENATION
Filed Dec. 26, 1967
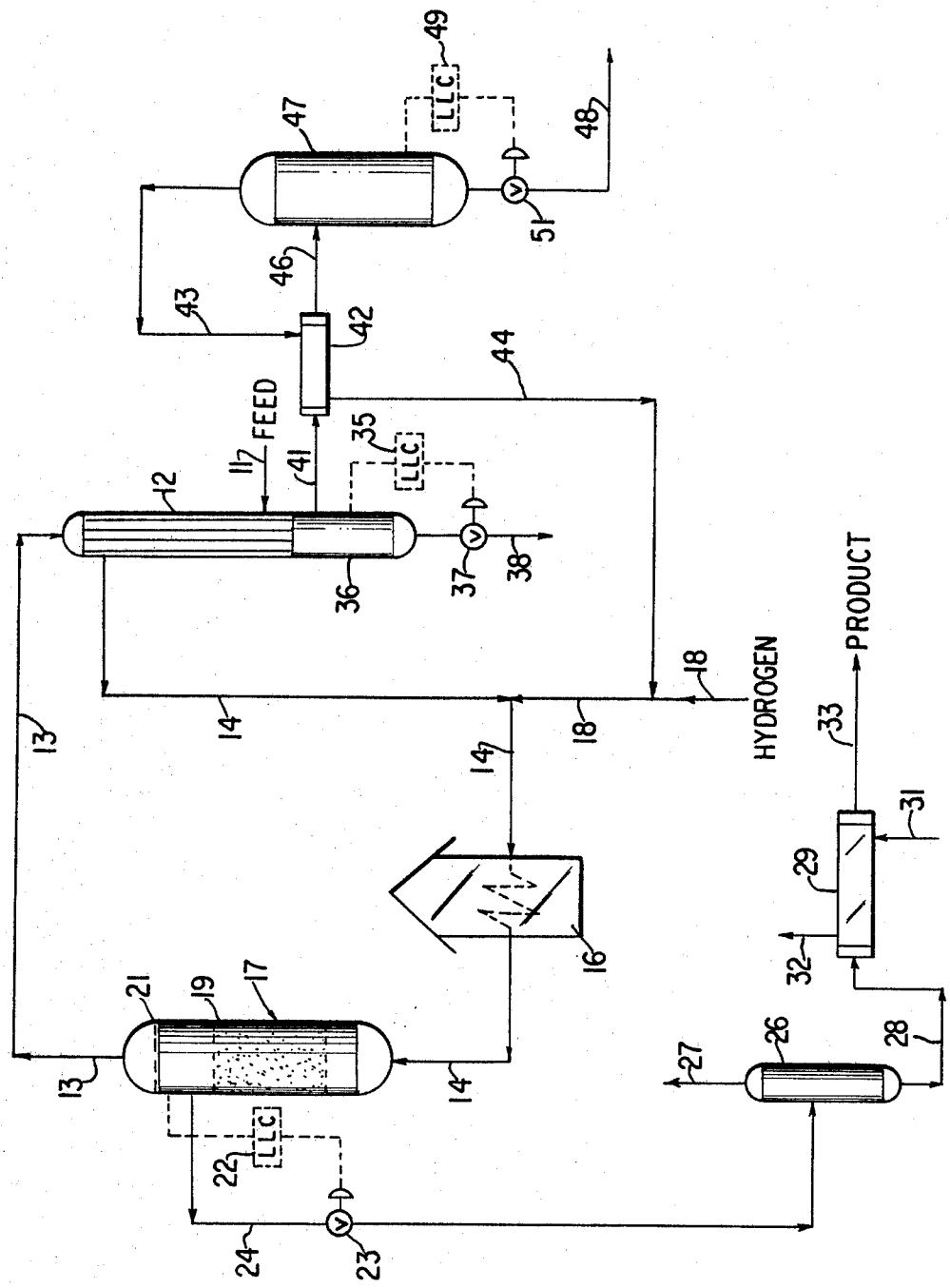
INVENTOR
ROGER P. VAN DRIESEN
BY J. Richard Geaman
ATTORNEY United States Patent Office 3,477,944
Patented Nov. 11, 1969

3,477,944
MAINTENANCE OF FLUID FLOW IN HEAVY HYDROCARBON OIL HYDROGENATION
Roger P. Van Driesen, Hopewell, N.J., assignor to Cities Service Research and Development Company, New York, N.Y., a corporation of Delaware
Filed Dec. 26, 1967, Ser. No. 693,534
Int. Cl. C10g *13/02, 23/02*
U.S. Cl. 208—143         4 Claims

ABSTRACT OF THE DISCLOSURE

Operating problems in the hydrogenation of heavy hydrocarbon oils are avoided by control of vapor to liquid ratios in high velocity, high pressure portions of the system so that wherever the linear velocity of fluid exceeds two feet per second, the ratio of vapor to liquid is maintained below about five to one or above about nine to one. Vapor to liquid ratios within the range of about 5:1 to about 9:1 have been found to cause excessive problems involving surging or slugging of fluid in the system.

---

This invention relates to the hydrogenation of heavy hydrocarbon oil at least a portion of which boils above 975° F. Such hydrogenation reactions may be directed primarily to cracking of the heavy oil to form lower boiling material or may be directed primarily to desulfurization of the oil or a combination of these reactions. Other reactions commonly found in association with these reactions may, of course, also take place. The techniques for conducting hydrogenation of such feed stocks under a wide variety of operating conditions are well known and established in the art. Among the known techniques for hydrogenation of heavy hydrocarbon oils are those in which the hydrocarbon oil feed, together with hydrogen-containing gas, is passed in an intimate vapor-liquid mixture upwardly through a reaction zone containing a mass of particulate hydrogenation catalyst at a rate sufficient to maintain the solids in random motion and under conditions such that there is a net chemical consumption of hydrogen and that the hydrocarbons in the effluent from the reaction zone are at least partially in the liquid phase. A suitable catalyst system for use in processes of this type is the so-called "ebullated bed" system described in more detail in U.S. Patent to Johanson Re. 25,770.

Operation of such hydrogenation processes involves the use of a high pressure reaction zone in which a mass of catalyst is maintained and an associated high pressure system for addition of reactants and withdrawal of products. Vapor and liquid products may be withdrawn from the reaction zone together but are preferably withdrawn separately to facilitate operation of feed and product heat exchangers. The high pressure system is in fluid pressure communication with the reaction zone and is maintained at substantially the same pressure (within about 100 p.s.i.) as the reaction zone. The high pressure system may include, for instance, heat transfer zones such as heat exchangers for heating feed or cooling product, preheat feed furnaces and transfer zones such as conduits for adding reactants to and withdrawing product from the reaction zone or for passing fluids between other portions of the high pressure system, etc.

In operating hydrogenation processes of the type described above, difficulty has been experienced because of unexplained variations in operating conditions including temperature, pressure and flow rates in the reactor and high pressure system. These variations, referred to sometimes herein as slugging, are on many occasions sufficiently severe to cause surging of catalyst in the reactor with overflow of catalyst into liquid product withdrawal lines and overflow of liquid product into vapor withdrawal lines. This frequently results in plugging of exchanger tubes and sometimes necessitates shutting down the entire process.

It has now been found that slugging of the type described above can be avoided if care is taken to maintain vapor to liquid ratios in the high pressure system at less than five volumes of vapor per volume of liquid or more than nine volumes of vapor per volume of liquid where the linear velocity of the fluid exceeds two feet per second. By maintaining the vapor to liquid ratio within these ranges, slugging is eliminated and smoother and more reliable operation is experienced.

The accompanying drawing is a somewhat diagrammatical illustration in which equipment is shown in elevation of a suitable arrangement of apparatus for carrying out a preferred embodiment of the present invention.

The present invention is useful primarily in the hydrogenation of heavy hydrocarbon oils having significant proportions, usually at least ten volume percent, boiling above 975° F. Suitable feed oils of this type include for instance, residual oil, uncracked gas oil, shale oil, bitumen (including that which occurs naturally, such as that found in the Athabasca tar sands), coal tar and other so-called "bottom of the barrel" materials.

Catalyst suitable for use in the hydrogenation processes of the present invention may be any suitable hydrogenation catalyst either natural or synthetic, the composition, size and quantity of which forms no part of the invention. Suitable catalyst includes for example, cobalt, iron, molybdenum, nickel, tungsten and cobalt-molybdate, as well as their sulfides and oxides, used alone or together with other suitable catalysts, such as naturally occurring silicates, etc. on suitable bases such as alumina or silica-alumina. The catalyst may be in the form of finely divided particles as small as 40 microns, or larger particles such as those described for use in the ebullated bed by the above-mentioned Johanson patent. In any event, the catalyst is present in the reaction zone in the form of a mass of particulate solids, usually having a concentration of at least 20 lbs./ft.$^3$, which is kept in random motion by the upward flow of gas and liquid therethrough. The ebullated bed described in the Johanson patent is a preferred type of catalyst bed but the invention is generally applicable to any catalyst bed in which the catalyst is kept in random motion. The term "hydrogenation catalyst" as employed herein refers to any such catalyst irrespective of additional functions such as cracking of hydrocarbons which the catalyst may perform.

Hydrogenation processes of the present invention are carried out under elevated conditions of temperatures and pressure. Temperatures normally range between about 700 and about 900° F. and pressures between about 1,000 and 3,000 p.s.i.g. partial pressure of hydrogen. Hydrogen rates between about 1,000 and about 10,000 standard cubic feet of hydrogen per barrel (s.c.f./b.) of feed are normal for such operations as are space velocities between about 0.2 and about 3.0 volumes of feed per hour per volume of reactor capacity (v./hr./v.).

With the exception of large diameter equipment such as the reactor itself, knockout drums, etc. fluid velocities in the high pressure section of the hydrogenation process frequently exceed about 2 feet per second. Fluid velocities of about 4 to 8 feet per second are for instance considered normal for liquid heat exchanger equipment and velocities between about 20 and 40 feet per second are frequently used for vapor passages in heat exchangers. Velocity in condiuts is, of course, also frequently well above 2 feet per second. In accordance with the present invention it is essential that the ratios of vapor to liquid in all portions of the high pressure hydrogenation system where fluid velocities exceed 2 feet per second, be maintained below about 5 volumes of vapor per volume of liquid or above about 9 volumes of vapor per volume of liquid. If the ratios of vapor to liquid in any portion of the high pressure system where velocities in excess of 2 feet per second exist fall within the range of about 5 to about 9 volumes of vapor per volume of liquid, slugging as described above frequently occurs. Such slugging affects not only the particular section of equipment in which the phenomenon first occurs, but also affects the remainder of the high pressure system. Thus, the effect of slugging occurring because of an undesirable vapor to liquid ratio in a product heat exchanger is transmitted back through the system to the reactor and may cause an overflow of catalyst in liquid drawoff lines, an overflow of liquid in vapor drawoff lines or other undesirable consequences, as well as causing a general cycling of all operating conditions in the entire system. Likewise, slugging originating because of improper vapor to liquid ratios in high pressure feed lines to the reactor can affect the entire system, including not only the reactor and catalyst bed, but also the downstream exchangers and product separation equipment in the high pressure section of the system.

The following example illustrates an application of the present invention to a process for the hydrogenation of heavy hydrocarbon oil to produce product of lower boiling range and sulfur content.

EXAMPLE

Referring to the drawing, heavy hydrocarbon feed oil enters the process through a conduit 11 and passes through a heat exchanger 12 in counter-current heat exchange with hot product vapors introduced into the exchanger 12 through a conduit 13 as described below. The heavy hydrocarbon feed oil introduced through the conduit 11 is West Texas vacuum bottoms at least 95 vol. percent of which boils above 975° F. and which has a gravity of 10.3° API and contains 3.1 wt. percent sulfur. From the heat exchanger 12 the feed oil passes through a conduit 14 and a preheat furnace 16 into a reactor 17, the interior of which forms a hydrogenation zone. Hydrogen-containing gas obtained as described below is introduced into the conduit 14 as through a conduit 18 and is heated and introduced into the reactor 17 along with the liquid feed.

In the reactor 17, a bed of particulate hydrogenation catalyst is maintained in an ebullated condition as taught by the above-mentioned Johanson patent by the upward flow of liquid and gas through the catalyst bed. In this particular example the catalyst is an extrudate of cobalt-molybdenum on alumina and has an average diameter of $\frac{1}{32}$ inch. The hydrogenation zone is maintained at a hydrogen partial pressure of 2400 p.s.i.g., a total pressure of 3400 p.s.i.g., a liquid space velocity of 1.0 v./hr./v., and a temperature of 825° F. An upper level of ebullation is maintained at an elevation in the reactor indicated at 19 and an upper liquid level is maintained at an elevation indicated at 21. Liquid level in the reactor may be controlled by suitable means, such as a liquid level controller 22, acting in conjunction with valve 23.

From the reactor 17 product liquid is withdrawn through a conduit 24 and passed through the valve 23 to a separation drum 26 from which vapor is withdrawn as through a conduit 27. Liquid from the separation drum 26 is withdrawn through a conduit 28 and passed through a heat exchanger 29 where it is cooled by indirect heat exchange with suitable cooling material such as fresh-liquid feed introduced into the exchanger through a conduit 31 and removed through a conduit 32. From the heat exchanger 29, the product liquid is withdrawn to storage or further treatment as through a conduit 33.

Vapor product is withdrawn from the reactor 17 through the conduit 13 and passed in indirect heat exchange with feed oil in the heat exchanger 12 as described above. Liquid is separated from vapor in a separation drum 36. Liquid level in separation drum 36 may be maintained as by liquid level controller 35 and valve 37 and liquid from the separating drum may be withdrawn through a conduit 38 and valve 37. Vapor from the separation drum 36 is passed through a conduit 41 to a heat exchanger 42 where it is passed in indirect heat exchange with recycle hydrogen introduced into the exchanger 42 through a conduit 43 and withdrawn therefrom through a conduit 44. From the heat exchanger 42 the recycle hydrogen proceeds through the conduit 44 to join fresh hydrogen introduced into the process through the conduit 18.

From the heat exchanger 42 vaporous product passes through a conduit 46 to a separation drum 47 in which liquid is separated and may be withdrawn through a conduit 48 and valve 51. Recycle gas is withdrawn from the separation drum 47 and recycled to the process through the conduit 43, heat exchanger 42 and conduit 44 as described above. Liquid level in the separation drum 47 is controlled by a liquid level controller 49 and valve 51. If desired, the recycle hydrogen may, of course, be treated in a conventional manner for removal of impurities therefrom.

Temperatures, pressures, flow rates, linear fluid velocities and vapor to liquid ratios at various points in the system illustrated in the drawing are as shown in Table 1 below. The reference numerals in the heading of Table 1 refer to corresponding lead lines in the drawing, the reference to the conduit 14 referring to the portion of the conduit between the furnace 16 and reactor 17.

TABLE I.—OPERATING CONDITIONS

| Conduit or separator | 14 | 36 | 26 |
|---|---|---|---|
| Temperature (° F.) | 790 | 550 | 825 |
| Pressure (p.s.i.g.) | 3,650 | 225 | 225 |
| Vapor rate (ft.³/hr.) | 9,058 | 8,152 | 6,780 |
| Liquid rate (ft.³/hr.) | 823 | 75 | 670 |
| Ratio vapor/liquid | 11:1 | 109:1 | 10:1 |

Hydrogen introduced through the conduit 18 and recycle hydrogen passing through the conduit 44 have the compositions shown in Table II below:

TABLE II.—COMPOSITION OF GAS STREAMS

| Component | Make-up hydrogen (conduit 18) (vol. percent) | Recycle hydrogen (conduit 44) (vol. percent) |
|---|---|---|
| H₂ | 65 | 78 |
| N₂ | 2.3 | 4.0 |
| CH₄ | 13.6 | 15.0 |
| C₂H₆ | 8.5 | 2.0 |
| C₃ | 6.4 | 1.0 |
| C₄ | 2.2 | |
| C₅ | 2.0 | |

From the above example, it can be seen that the vapor to liquid ratios in all portions of the system shown in the drawing where linear velocities of fluid are in excess of 2 feet per second are maintained within the critical ratios specified above so that slugging does not occur anywhere in the system. This is in contrast to normal practice in which very little, if any, attention is paid to vapor to liquid ratios, and slugging frequently occurs in various portions of the system due to vapor to liquid ratios falling outside of the critical areas specified herein.

While the invention has been described above with respect to a preferred embodiment thereof, it will be understood by those silled in the art that various changes and modifications may be made without departing from the spirit and scope of the invention and it is intended to cover all such changes and modifications in the appended claims.

I claim:

1. In a process for the hydrogenation of heavy hydrocarbon feed oil at least about 10 volume percent of which boils above 975° F., in which such feed oil is passed in an intimate vapor-liquid mixture upwardly through a high pressure reaction zone containing a mass of particulate hydrogenation catalyst at a sufficient rate to maintain the catalyst in random motion, wherein the treatment is carried out under such operating conditions that there is a net chemical consumption of hydrogen and that the hydrocarbons in the effluent from said reaction zone are at least partially in the liquid phase and in which product from the reaction zone is withdrawn in pressure communication with the reaction zone through at least one transfer zone and at least one heat transfer zone at linear velocities exceeding about 2 ft./sec. before being passed out of pressure communication with the reaction zone, the improvement which comprises maintaining the ratio of vapor to liquid in said transfer and heat transfer zones outside the range of from about five volumes of vapor per volume of liquid to about nine volumes of vapor per volume of liquid.

2. The process of claim 1 in which vaporous product from the reaction zone is passed through a plurality of transfer zones and heat transfer zones while in pressure communication with the reaction zone and in which liquid is removed from such product subsequent to its passage through each heat transfer zone to thereby maintain the ratios of vapor to liquid as specified in claim 1.

3. The process of claim 1 in which the reaction zone is maintained at a hydrogen partial pressure between about 1,000 and about 3,000 p.s.i.g. and the pressure in the transfer and heat transfer zones is maintained within about 100 p.s.i. of the reaction zone pressure.

4. The process of claim 1 which includes introducing reactants into the reaction zone through at least one transfer zone and one heat transfer zone at linear velocities exceeding about 2 ft./sec. and in pressure communication with the reaction zone while maintaining the ratio of vapor to liquid of reactants in such transfer and heat transfer zones outside the range of from about five volumes of vapor per volume of liquid to about nine volumes of vapor per volume of liquid.

References Cited

UNITED STATES PATENTS

| | | | |
|---|---|---|---|
| 1,923,576 | 8/1933 | Krauch et al. | 208—108 |
| 1,955,829 | 4/1934 | Pier et al. | 208—108 |
| 3,322,665 | 5/1967 | Chervenak et al. | 208—108 |
| 3,338,820 | 8/1967 | Wolk et al. | 208—143 |
| 3,412,010 | 11/1968 | Alpert et al. | 208—143 |

HERBERT LEVINE, Primary Examiner

U.S. Cl. X.R.

208—108, 111, 112